United States Patent
Chiang

(10) Patent No.: US 8,392,169 B2
(45) Date of Patent: Mar. 5, 2013

(54) SIMULATING VIRTUAL OPTICAL DISC RECORDER BY USING A STORAGE DEVICE AND METHOD FOR THE SAME

(75) Inventor: Chi-hung Chiang, Tucheng (TW)

(73) Assignee: Genesys Logic, Inc., Shindian (TW)

( * ) Notice: Subject to any disclaimer, the term of this patent is extended or adjusted under 35 U.S.C. 154(b) by 272 days.

(21) Appl. No.: 12/786,177

(22) Filed: May 24, 2010

(65) Prior Publication Data

US 2011/0231177 A1 Sep. 22, 2011

(30) Foreign Application Priority Data

Mar. 19, 2010 (TW) ................................ 99108214 A

(51) Int. Cl.
*G06F 9/445* (2006.01)

(52) U.S. Cl. .............. 703/22; 703/24; 703/26; 713/160; 713/186; 713/188; 717/113; 717/139; 369/53.31; 369/86

(58) Field of Classification Search .................... 703/22, 703/24–26; 717/113, 139, 160; 713/186, 713/200, 160, 188; 369/53.31, 47.32, 84

See application file for complete search history.

(56) References Cited

U.S. PATENT DOCUMENTS

| | | | | |
|---|---|---|---|---|
| 6,693,869 | B1* | 2/2004 | Ballantyne | 369/84 |
| 6,882,795 | B1* | 4/2005 | McMurdie et al. | 386/200 |
| 7,321,539 | B2* | 1/2008 | Ballantyne | 369/84 |
| 2002/0078367 | A1* | 6/2002 | Lang et al. | 713/200 |
| 2005/0157619 | A1* | 7/2005 | Miyawaki et al. | 369/47.32 |
| 2005/0165890 | A1* | 7/2005 | McMurdie et al. | 709/203 |
| 2009/0083589 | A1* | 3/2009 | Fulton et al. | 714/48 |
| 2009/0083705 | A1* | 3/2009 | Phillips et al. | 717/113 |

* cited by examiner

*Primary Examiner* — Thai Phan

(57) ABSTRACT

Generating a virtual CD recorder by using a storage device is proposed. The storage device includes a first data sector for storing auto-run data and a second data sector for storing table of content (TOC) information data. When the storage device is connected to a host, a detecting module of the host detects whether the TOC information data exists in the second sector. When the TOC information data exists or could be accessed, a reading module can read a first disc image file based on the TOC information data. A burning module can record data into a second disc image file and update the TOC information data associated with the second disc image file in the second sector.

9 Claims, 2 Drawing Sheets

SIMULATING VIRTUAL OPTICAL DISC RECORDER BY USING A STORAGE DEVICE AND METHOD FOR THE SAME

CLAIM OF PRIORITY

This application claims priority to Taiwanese Patent Application No. 099108214 filed on Mar. 19, 2010.

FIELD OF THE INVENTION

The present invention is related to a storage device with a flash memory, more particularly, to a storage device with a flash memory to simulate a virtual optical disc recorder.

DESCRIPTION OF PRIOR ART

Generally speaking, films, music, data, or contents of a CD/DVD are recorded onto a blank writeable optical disc through a burning module and a CD/DVD rewritable drive. However, rather than using CD/DVD rewritable drive blank writeable optical discs, films, music, data, or the contents of a CD/DVD can be recorded on a virtual simulating disc, i.e. an optical disc image file, with a virtual optical disc recorder. Any films, music, data, or any of the contents of a CD/DVD that a user wants to burn can be recorded as a virtual optical disc with the virtual optical disc recorder. The user can read the optical disc image file with the virtual optical disc recorder. More importantly, the access speed of the virtual optical disc recorder is faster than that of an authentic optical disc drive.

A USB (Universal Serial Bus) flash drive has been a widely-used storage device for sometime. When the USB flash drive is inserted into the USB slot of a personal computer (PC), the PC will take it as a kind of disc device and show it on the screen as a disc drive for the PC user to store data and to utilize the stored data arbitrarily. The flash memory inside the USB flash drive is divided into two parts, LUN0 and LUN1. LUN0, serving as a data sector, is designed as a read-only optical disc drive where media data or auto-run software or software programs are stored. When the USB flash drive is connected to a host (e.g., a PC), the media data or software programs in the optical disc drive can be read or executed beforehand through the operating system (OS) in order to be automatically performed. Meanwhile, LUN1 is still like a normal readable and writeable flash memory. When the USB flash drive is inserted into the USB slot of a PC, it is regarded as two disc devices by the PC and shown on the screen. The PC user can store data into LUN1 at will, but he/she cannot store data into LUN0; instead, the user can only read data in the LUN0 or allow the LUN0 auto-run media data or software programs. In other words, because LUN0 is announced as a read-only optical disc drive, the data in the LUN0 is fixed as a supplier's auto-run programs, and because the table of contents (TOC) information read from the virtual optical disc, which corresponds to the contents of the virtual optical disc inside the virtual optical disc recorder, is stored into the controller of the USB flash drive. This means the PC user cannot update or change the contents of the virtual optical disc, hence the optical disc drive per se does not have the burning function so that the range of applications of the entire optical disc drive is limited to perform the read-only function. Other multimedia applications of the optical disc drive cannot be completely utilized, and that is quite regrettable.

SUMMARY OF THE INVENTION

Therefore, the object of the present invention is to provide a storage device and method for the same by using a storage device to simulate a virtual optical disc recorder. With this storage device and method for the same, the problem that traditional virtual optical disc recorders that are simulated by a storage device to read only rather than to read and write both is resolved.

According to the present invention, a storage device used for generating a virtual optical disc recorder comprises a controller for performing an operation of the storage device, and a flash memory comprises a first sector for storing an optical disc image file, a second sector for storing parameters associated with the optical disc image file, and a third sector for arbitrarily storing data.

In another aspect of the present invention, a method of generating a virtual optical disc recorder by using a storage device, comprises the following steps of:

provides a storage device comprising a flash memory and a controller, the flash memory comprises a first sector for storing a first optical disc image file, a second sector for storing parameters associated with the first optical disc image file, and a third sector for arbitrarily storing data;

when the storage device is connecting to a host, the controller reports the storage device comprising a first device to the host;

the controller sends the parameter to the host;

the controller reports the storage device supporting burning function to the host;

the host reads the first optical disc image file based on the parameters by means of the first device; and when the host is burning the first optical disc image file with the first device, a burning module of the host burns data to be written as a second optical disc image file.

The disclosed inventions will be described with references to the accompanying drawings, which show important example embodiments of the inventions and are incorporated in the specification hereof by related references.

DETAILED DESCRIPTION OF THE PREFERRED EMBODIMENTS

Figure 1:
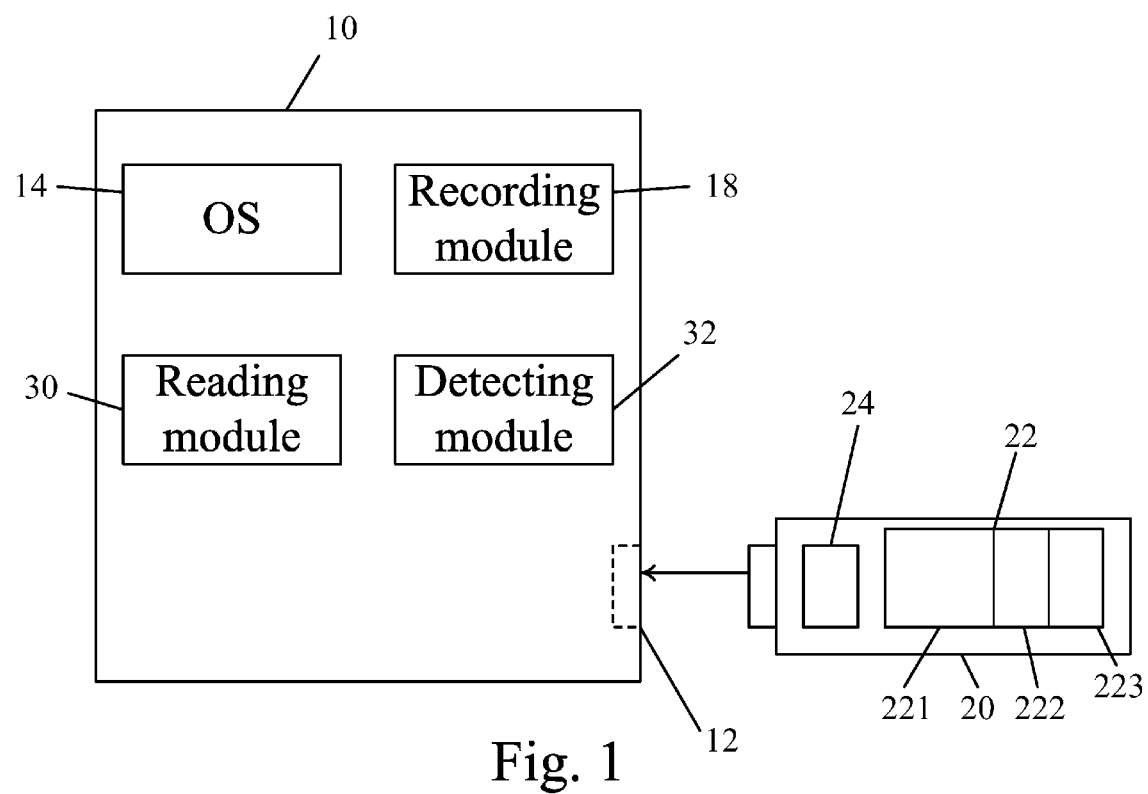
FIG. 1 is a host and a storage device connecting to the host according to a preferred embodiment of the present invention.

Referring to FIG. 1, FIG. 1 is a host 10 and a storage device 20 connecting to the host 10 (e.g., a USB flash drive or an MP3 player) according to a preferred embodiment of the present invention. The host 10 can be a storage device, e.g. a PC or a notebook computer, comprises a connection port 12, an operating system (OS) 14, a burning module 18, a reading module 30, and a detecting module 32. The storage device 20 comprises a flash memory 22 and a controller 24. The flash memory 22 of the storage device 20 is divided into a first data sector 221, a second data sector 222, and a third data sector 223. In the present invention, the first data sector 221, belonging to LUN0, is designed to be a virtual optical disc recorder where media data or software programs are stored, and files that are required to be automatically performed are stored as optical disc image files. Meanwhile, the table of contents (TOC) information which corresponds to the virtual optical disc is stored into the second data sector 222. When the storage device 20 is connecting to the host 10, media data or software programs in the virtual optical disc recorder can be read or executed beforehand through the OS 14 in order to perform the auto-run function. The third data sector 223 serves as a normal memory sector where data can be read or written. A user can store data into the third data sector 223 through the host 10 while the user cannot store data into the first data sector 221 directly. The user can read data or execute programs in the first data sector 221 merely through the virtual optical disc recorder, or the user can auto-run media data or software programs through the virtual optical disc recorder simulated by the first data sector 221.

After the storage device 20 is inserted into the host 10, the controller 24 of the storage device 20 is reporting items such as device categories (that is, to announce to be an optical disc drive, a CD/DVD rewritable drive, or other kinds of disc devices) to the host 10 in accordance to the set data stored in the first data sector 221 of the flash memory 22. By means of the OS 14, the media data or software programs in the optical disc drive are read or executed in advance. The storage device 20 is connecting to the host 10 through a device connection interface such as USB, PATA, SATA, eSATA, and IEEE1394.

Figure 2:
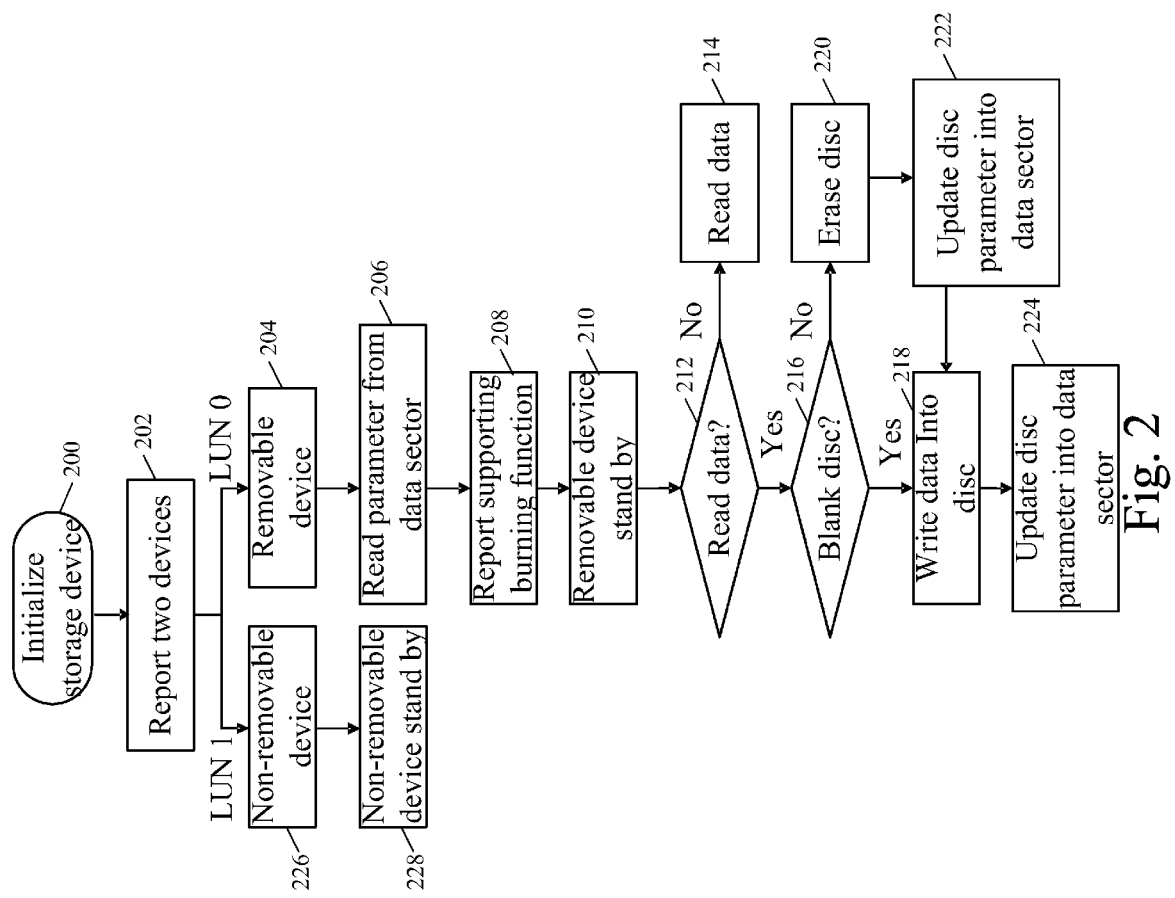
FIG. 2 illustrates a flowchart of the virtual optical disc recorder produced by using the storage device.

Referring to both FIG. 1 and FIG. 2, FIG. 2 illustrates a flowchart of the virtual optical disc recorder produced by using the storage device 20. After the storage device 20 is inserted into the connection port 12 (e.g., a USB slot) of the host 10, the host 10 provides the storage device 20 with power and initializes the storage device 20 (Step 200). Then, the host 10 activates the controller 24. The controller 24 sends a request to the host 10, and then makes a report that the storage device 20 comprises two devices (Step 202). Afterwards, the controller 24 sends other requests to the host 10. The controller 24 may report back to the host 10 in such that, for example, the third data sector 223 of the storage device 20 (i.e., LUN1) is serving as a non-removable device (Step 226) and that the first data sector 221 of the storage device 20 (i.e., LUN0) is serving as a removable device (Step 204). It is noted that the second data sector 222 is serving as a sector so the storage device 20 cannot report back to the host 10 on the existence of the second data sector 222. Then, through the controller 24, the detecting module 32 of the host 10 determines the associated parameters of the optical disc such as TOC information, disc capacity, disc lead-out, etc., from the second data sector 222 of the flash memory 22. Subsequently, the OS 14 of the host 10 reads the CDFS file system on the virtual optical disc and separates the first data sector 221 from which a capacity of 640 MB to 4.8 GB is used as a virtual CD/DVD. An ordinary optical disc drive adopts the CDFS file system while an ordinary storage medium, such as a hard disc and a flash memory, adopts the FAT or NTFS file system. Because the optical disc drive and the storage medium adopt different file systems, it is necessary to use the virtual optical disc recorder to read the virtual optical disc. At this time, the host 10 has obtained the associated parameters of the optical disc such as TOC information from the second data sector 222 of the flash memory 22, and meanwhile, the controller 24 reports back to the host 10 that the removable device supports the burning function (Step 208), so the burning module 18 of the host 10 is able to provide a write-in-data function. The burning module 18 can be any ordinary burning software. In a process of reading, the host 10 reads an optical disc image file according to the TOC information read from the optical disc (Step 214). If the host 10 issues a write-in command, the burning module 18 then decides the status of the virtual optical disc recorder according to the TOC information read from the optical disc (Step 216). If a blank disc is ascertained according the TOC information data of the second data sector 222, then the user can perform normal burning operations of the CD/DVD rewritable drive to the electronic device 20 through the burning module 18 on the host 10 (Step 218). At this time, the burning module 18 simulates and supports burning commands to enable the burning module 18 to successfully burn the data that the user would like to write into the optical disc image file and store the data into the first data sector 221 of the storage device 20. Upon completion of the burning process, the associated parameters of the optical disc are stored into the second data sector 222 as well for allowing a future disc read access. The burning module 18 has many kinds of burning modes such as a disc-at-once (DAO) mode and a track-at-once (TAO) mode while the TOC information frame of each kind of burning mode is different from each other. Therefore, the burning module 18 has to be able to timely keep track of the TOC information contents of each burning process and the differences between the TOC information. As a result, the host 10 can correctly read out the data contents ahead of burning after the burning is completed. When the burning is complete, the burning module 18 then reports back on the status of the optical disc image file as "complete", and meanwhile, the data inside becomes write protected. By means of this write-in feature, another protection mechanism can be provided so that problems such as data inside the hard disc and USB flash drive lacking write-in protection mechanism can be improved. If the TOC information of the second data sector 222 is determined not to be a blank disc (Step 216), the user can clean up the data stored on the optical disc through the erase function provided by the burning module 18. In other words, the user can erase the previous data on the optical disc image file (Step 220), then store a newly burned optical disc image file into the first data sector 221, and meanwhile, update the TOC information data of the second data sector 222 to correspond to the new optical disc image file (Step 222).

In addition, when the reading module 30 attempts to read the data of the optical disc image file, the reading module 30 has to refer to the TOC information read from the optical disc, which keeps track of the track information of the whole optical disc image file. In this way, the host 10 can realize what kinds of data are on the optical disc image file. By utilizing/realizing such characteristic, the reading module 30 can control the status of the TOC information read from the optical disc to achieve the goal of data protection depending on an ATAPI command such as SYNC_CACHE, SEND_CUE_SHEET, and READ_TOC information. In addition, the reading module 30 can take control of TOC information through a vendor command of the software to determine if the host 10 can read out the contents of the optical disc.

It is noted that the burning module 18, the reading module 30, and the detecting module 32 are all software program codes that are stored in the memory of the host 10.

Compared with the prior art, the flash memory of the storage device of the present invention comprises a first data sector where a virtual optical disc recorder is produced and a third data sector where data can be read/written randomly. In addition, the flash memory of the storage device of the present invention comprises a second data sector where renewable associated parameters of the optical disc drive, such as TOC information read from the optical disc, are stored. When a user reads/writes with the virtual optical disc recorder, the host then reads the TOC information in the second data sector to decide the present status of the virtual optical disc (i.e., the optical disc image file) in the virtual optical disc recorder. If the host decides the status of the virtual optical disc to be blank, it means that the user can use the burning module of the host to copy files in the optical disc drive or burn files in the storage device to CD format in order to achieve the goal of write protection. If the host decides that the virtual optical disc is not a blank disc, it means that the user can also issue a blank command to the virtual optical disc through the erase function provided by the burning module to clean up the data on the optical disc image file. In this way, the present invention is the same as an authentic CD/DVD rewritable drive in practical use. Besides, the present invention provides a write-in function which is not possessed by any other simulating read-only optical disc drives on the market nowadays.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A storage device for generating a virtual optical disc recorder, comprising:
    a controller for performing an operation of the storage device; and
    a flash memory comprising a first sector for storing an optical disc image file, and a second sector for storing parameters associated with the optical disc image file, wherein the parameters comprise Table-of-Contents (TOC) information, disc capacity information and disc lead out information.

2. The storage device of claim 1, wherein a file system of the flash memory is FAT or NTFS.

3. The storage device of claim 1, wherein the flash memory further comprises a third sector for arbitrarily storing data.

4. A method of generating a virtual optical disc recorder by using a storage device, comprising:
    providing a storage device comprising a flash memory and a controller, the flash memory comprising a first sector for storing a first optical disc image file, and a second sector for storing parameters associated with the first optical disc image file, wherein the parameters comprise Table-of-Contents (TOC) information, disc capacity information and disc lead out information;
    when the storage device is connecting to a host, the controller reporting the storage device comprising a first device to the host;
    the controller sending at least one of the parameters to the host;
    the controller reporting the storage device supporting burning function to the host;
    the host reading the first optical disc image file based on the parameters by means of the first device; and
    when the host is burning the first optical disc image file with the first device, a burning module of the host burning data to be written as a second optical disc image file.

5. The method of claim 4 further comprising a step of erasing the parameters associated with the first optical disc image file prior to burning the second optical disc image file.

6. The method of claim 5 further comprising a step of updating parameters associated with the second optical disc image file subsequent to burning the second optical disc image file.

7. The method of claim 4, wherein a file system of the flash memory is FAT or NTFS.

8. The method of claim 4, wherein the storage device further comprises a third sector for arbitrarily storing data.

9. The method of claim 4 further comprising a step of: the controller reporting the storage device comprising a non-removable device to the host.

* * * * *